(12) United States Patent
Shusteff et al.

(10) Patent No.: US 11,809,161 B2
(45) Date of Patent: Nov. 7, 2023

(54) COMPUTED AXIAL LITHOGRAPHY OPTIMIZATION SYSTEM

(71) Applicants: Lawrence Livermore National Security, LLC, Livermore, CA (US); The Regents of the University of California, Oakland, CA (US)

(72) Inventors: Maxim Shusteff, Piedmont, CA (US); Kyle Champley, Pleasanton, CA (US); Erika Jo Fong, San Ramon, CA (US); Hayden Taylor, Berkeley, CA (US); Chi Chung Li, Berkeley, CA (US); Trevor Rongey, Jr., Livermore, CA (US); Sui Man Luk, Berkeley, CA (US); Heting Fu, Berkeley, CA (US); Samira Feili, Berkeley, CA (US); Joseph Toombs, Berkeley, CA (US); Hossein Heidari, Berkeley, CA (US)

(73) Assignees: Lawrence Livermore National Security, LLC, Livermore, CA (US); The Regents of the University of California, Oakland, CA (US)

( * ) Notice: Subject to any disclaimer, the term of this patent is extended or adjusted under 35 U.S.C. 154(b) by 415 days.

(21) Appl. No.: 16/927,469

(22) Filed: Jul. 13, 2020

(65) Prior Publication Data
US 2022/0011742 A1 Jan. 13, 2022

(51) Int. Cl.
*G05B 19/4099* (2006.01)
*G06T 7/00* (2017.01)

(52) U.S. Cl.
CPC ........ *G05B 19/4099* (2013.01); *G06T 7/0004* (2013.01); *G05B 2219/49023* (2013.01); *G06T 2207/30108* (2013.01)

(58) Field of Classification Search
CPC ...... G05B 19/4099; G05B 2219/49023; G06T 7/0004; G06T 2207/30108; B29C 64/129;
(Continued)

(56) References Cited

U.S. PATENT DOCUMENTS 7,705,309 B1 * 4/2010 Jin .......................... G01J 5/08
250/370.08
10,354,445 B2 * 7/2019 Greene ................. G06T 15/506
(Continued)

FOREIGN PATENT DOCUMENTS

CN 105943406 A 9/2016
EP 0292402 A1 * 11/1988
(Continued)

OTHER PUBLICATIONS

Grant Gullerg, "Attenuated Radon Transform: Theory and Application N Medicine and Biology" Ph. D. thesis, Lawrence Berkeley Laboratory, University of California, Jul. 30, 1979 (Year: 1979).*
(Continued)

*Primary Examiner* — Thomas C Lee
*Assistant Examiner* — Michael Tang
(74) *Attorney, Agent, or Firm* — Perkins Coie LLP

(57) ABSTRACT

A system for determining a light intensity field for use in manufacturing a 3D object from a volume of material. The system receives a 3D specification of a 3D geometry for the 3D object that specifies voxels within the volume that contain material that is to be part of the 3D object. The system employs a cost function for effectiveness of a light intensity field in manufacturing the 3D object. The cost function may be an adjoint of an Attenuated Radon Transform that models an energy dose that each voxel would receive during manufacture of the 3D object using the light intensity field. The system applies an optimization technique that employs the cost function to generate a measure of the
(Continued)

effectiveness of possible light intensity fields and outputs an indication of a light intensity field that will be effective in manufacturing the 3D object.

66 Claims, 6 Drawing Sheets

(58) Field of Classification Search
CPC ..... B29C 64/241; B29C 64/393; B33Y 10/00; B33Y 30/00; B33Y 50/02
USPC .......................... 700/118; 264/401, 462, 463
See application file for complete search history.

(56) References Cited

U.S. PATENT DOCUMENTS

| | | | | |
|---|---|---|---|---|
| 2006/0028442 | A1* | 2/2006 | Bynum | G06F 3/0317 345/157 |
| 2006/0171653 | A1* | 8/2006 | Demos | H01L 21/02126 257/E21.241 |
| 2010/0029801 | A1 | 2/2010 | Moszner et al. | |
| 2010/0061656 | A1* | 3/2010 | Wiemker | G06T 5/002 382/275 |
| 2013/0101194 | A1* | 4/2013 | Zeng | G06T 11/006 382/131 |
| 2015/0117733 | A1* | 4/2015 | Manjeshwar | G06T 11/003 382/131 |
| 2015/0178908 | A1* | 6/2015 | Jesenko | A61C 19/04 433/29 |
| 2016/0306277 | A1* | 10/2016 | Lee | G03F 7/30 |
| 2018/0326666 | A1* | 11/2018 | Kelly | B29C 64/135 |
| 2022/0088873 | A1* | 3/2022 | Voit | B29C 64/282 |

FOREIGN PATENT DOCUMENTS

| | | |
|---|---|---|
| KR | 102106102 B1 | 5/2020 |
| WO | 2019043529 A1 | 3/2019 |

OTHER PUBLICATIONS

Brett Kelly, et al., "Volumetric additive manufacturing via tomographic reconstruction", Science 363, 1075-1079 (2019), Published online Jan. 31, 2019. (Year: 2019).*
International Search Report and Written Opinion received in Application No. PCT/US21/41306, dated Dec. 21, 2021, 9 pages.
Bernal, N., P., "Volumetric Bioprinting of Complex Living-Tissue Constructs within Seconds," Wiley-VCH Verlag GmbH & Co. KGaA, Weinheim, Adv. Mater. 2019, 31, 1904209.
Kelly, E., B., et al., "Volumetric additive manufacturing via tomographic reconstruction," Science 363, 1075-1079 (2019).
Kelly, E., B., et al., "Volumetric additive manufacturing via tomographic reconstruction," Supplementary Materials published Jan. 31, 2019 on Science First Release.

* cited by examiner

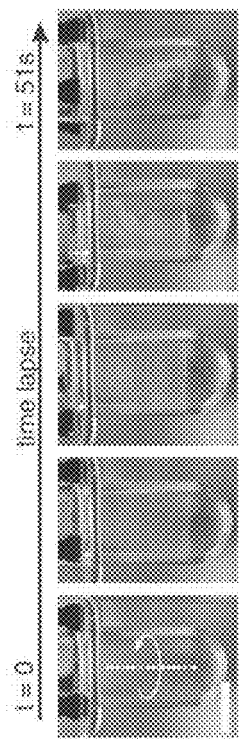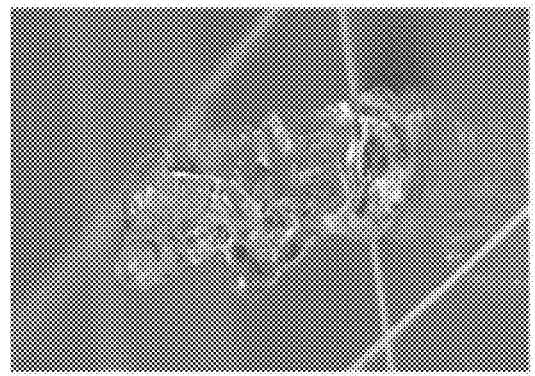
FIG. 1A
FIG. 1C
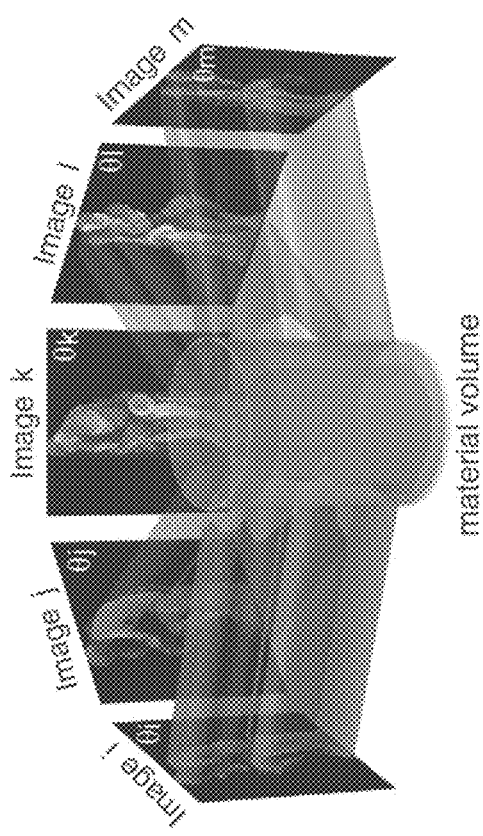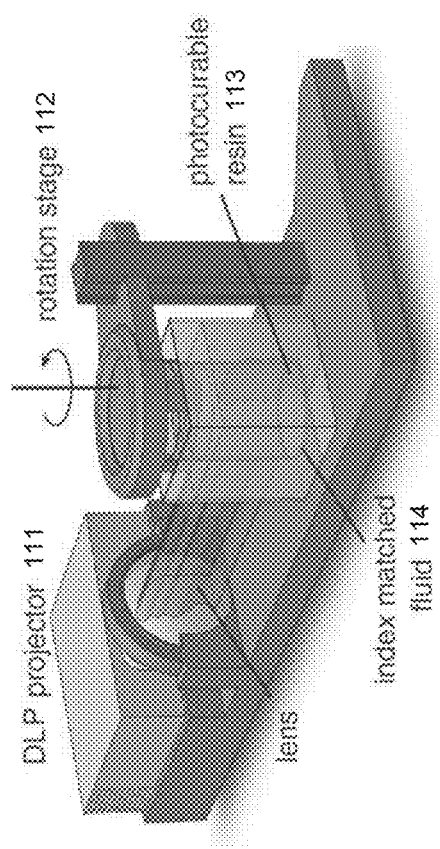
FIG. 1B
FIG. 1D

COMPUTED AXIAL LITHOGRAPHY OPTIMIZATION SYSTEM

STATEMENT REGARDING FEDERALLY SPONSORED RESEARCH

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND

Additive Manufacturing ("AM") technologies are increasingly used to manufacture a range of products such as medical devices, aerospace components, automotive components, and tools. Most AM technologies (also referred to as 3D printing) create a 3D object by repeatedly adding material at selected locations layer-by-layer until the 3D object is complete. Such layer-by-layer building of 3D objects has drawbacks such as relatively slow manufacturing, degraded quality of object surfaces, and limitations when the geometry to be produced has overhanging, bridging, or spanning elements.

Recently, Computed Axial Lithography ("CAL"), also referred to as Volumetric Additive Manufacturing ("VAM"), has been proposed for overcoming some of these drawbacks. CAL supports the manufacturing of 3D objects with arbitrary geometries volumetrically through photopolymerization of a desired geometry in a single step, rather than by layer-wise addition. CAL selectively solidifies a photosensitive liquid (e.g., resin) within a container by projecting two-dimensional images onto the container from different angles so that a desired amount of light energy is delivered to each portion of the material. The projecting of images ("projector images") from multiple angles results in a 3D energy dose sufficient to solidify (e.g., cure) the material in the geometry of the 3D object. The liquid that did not solidify can be washed away, leaving the 3D object.

CAL may employ hardware that includes a digital light processing ("DLP") projector and a rotation stage. The container holding the resin is loaded onto the stage to rotate the container during manufacturing. The DLP projector outputs intensity-modulated projector images that are synchronized to the rotation rate of the rotation stage. The light energy of the projector images results in the generating of free radicals in the resin that are initially quenched and deactivated by an inhibitor. As the manufacturing continues, the inhibitor will be depleted at the desired sub-volumes (e.g., voxels) within the container, allowing the polymerization reaction to proceed and the resin in those sub-volumes to cure. CAL is described in Kelly, et. al., "Volumetric Additive Manufacturing via Tomographic Reconstruction," *Science*, (6431):1075-79, (2019), which is hereby incorporated by reference.

FIG. 1B illustrates a DLP projector and a rotation stage. The DLP projector 111 projects images in the direction of the rotation stage 112. The rotation stage includes a container of resin 113. As the rotation stage rotates, the DLP projector projects projector images with each pixel of each projector image having a light energy selected so that the resin within the 3D geometry of the object will cure before the other resin. FIG. 1A illustrates images that are projected to manufacture the 3D object that is in the shape of the Thinker. FIG. 1C illustrates snapshots of the container over time during the manufacturing of the 3D object. FIG. 1D illustrates the manufactured 3D object.

CAL determines the images by reversal of the processing used in Computed Tomography ("CT"). CT determines the 3D geometry of a 3D object from X-ray radiographic images collected at different angles, and CAL determines what the projector images would be given the 3D geometry of the 3D object.

More specifically, CT employs an X-ray source to send X-rays through an object at different angles around the object and an X-ray detector to collect a resulting radiographic image for each angle. Each image represents the sum of the linear attenuation coefficients ("LACs") of the material of the object through which the X-rays pass. The intensities of the X-rays passing through material with a high integrated LAC will be lower than those passing through material with a low integrated LAC. CT then reconstructs a 3D representation of the object from the radiographic images.

CAL, in contrast, generates a 3D object directly from 3D geometry of the 3D object and, given the 3D geometry, employs a reverse process to determine the intensity of light for each pixel of each projector image to deliver energy to the volume of resin so that only the portions of the resin within the 3D geometry will cure. The projecting of the projector images onto the container results in each portion (e.g., voxel) of the resin within the container having a cumulative energy ("energy dose or dose") delivered to it. The 3D geometry can be represented by a 3D data structure ("dose map") that includes a data element for each voxel that contains the energy dose of that voxel.

BRIEF DESCRIPTION OF THE DRAWINGS

FIG. 1A illustrates images that are projected to manufacture the 3D object.

FIG. 1B illustrates a DLP projector and a rotation stage.

FIG. 1C illustrates snapshots of the container over time during the manufacturing of the 3D object.

FIG. 1D illustrates the manufactured 3D object.

DETAILED DESCRIPTION

Figure 2A:
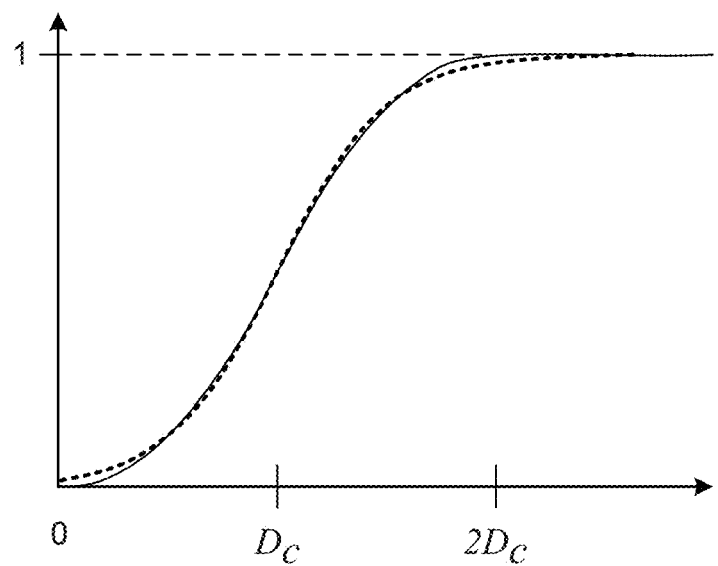
FIGS. 2A and 2B illustrate plots of $u_1$ and $u_2$.

A Computed Axial Lithography Optimization ("CALO") system is provided to determine the light intensity field ("LIF") needed to cure photoreactive material during the manufacturing of a 3D object having a 3D geometry. In some embodiments, the photoreactive material is resin and is confined by a container during manufacturing. The CALO system determines the light intensity field emitted by a light source (e.g., a DLP projector) assuming the container rotates relative to a stationary light source or equivalently that the light source revolves around a stationary container. A LIF represents the light intensities for a sequence of images along with the angles around the container at which the images are projected onto the container. The LIF is referred to as having a sequence of image that are to be projected. The CALO system employs a Radon Transform ("RT"), such as an Attenuated Radon Transform ("ART") or Exponential Radon Transform ("ERT"), to determine the light intensity field needed to manufacture the 3D object. An RT maps a function $f$ defined on a plane to a function $R_f$, defined on the space of lines in the plane, whose value at a line is the line integral of the function over that line. An RT can also map a function defined in 3D space. The ERT allows weighting of each line but only with constant value. So, the ERT can be used to represent materials that have a constant attenuation during manufacturing of a 3D object. Some materials, however, have an attenuation that varies during manufacturing of a 3D object, and the ERT cannot accurately model the attenuation of such material. The CALO system employs the ART to overcome the constant attenuation limitation of the ERT. In contrast to the ERT, the ART allows a weighting of lines that can vary along each line. In the following, the CALO system is described primarily in the context of using an ART. Once the light intensity field is determined, it can be used to control a DLP projector and a rotation stage to manufacture the 3D object.

In some embodiments, the CALO system determines a light intensity to be used in the manufacturing of a 3D object. The 3D object may have any shape, for example, such as the Thinker of FIG. 1D. The CALO system determines the light intensity field for use in manufacturing a 3D object from a volume of material (e.g., within a container). The material, such as resin, and has a dose cure threshold indicating dose of light that results in curing material. The CALO system inputs a 3D specification of a 3D geometry for the 3D object, the 3D specification specifying voxels within the volume that contain material that is to be part of the 3D object. Continuing with the Thinker example, the 3D specification of the Thinker would specify that voxels within the shape of the Thinker are to be part of the Thinker and that all other voxels are not to be part of the Thinker. The CALO system employs a cost function (also referred to as a loss function) that expresses a measure how effective of a light intensity field would be in the manufacturing of the 3D object. The closer the measure is to zero the more effective the light intensity field would be. The cost function may be based on an adjoint of an Attenuated Radon Transform ("ART") that models the dose of light that each voxel would receive during manufacture of the 3D object using the light intensity field. The CALO system determines a light intensity field that will be effective in manufacturing the 3D object by applying an optimization technique based on the cost function, which is differentiable. The optimization technique, such as a gradient descent technique, that employs the cost function to generate a measure of the effectiveness of possible light intensity fields. The optimization technique identifies a light intensity field that will be effective in manufacturing the 3D object based on minimizing the cost function. The CALO system may then output an indication of the light intensity field to a projector for use in manufacturing the 3D object.

Table 1 provides definition of symbols used to describe the CALO system.

TABLE 1

| Symbol | Name | Description |
|---|---|---|
| $f_T(x)$ | target geometry | a value for each voxel with a value of zero meaning not part of the object and a value of one meaning part of the object |

TABLE 1-continued

| Symbol | Name | Description |
|---|---|---|
| $g(s, \varphi, z)$ | light intensity field | for each image, an intensity values (W/mm$^2$) for each pixel of the backprojected image (parallel beam coordinates) |
| $D_c$ | dose curing threshold | cumulative energy (J/mm$^3$) needed to cure the resin may be a constant throughout the container or may vary across the container |
| $\Omega$ | rotation rate | rate at which the container rotates (sec$^{-1}$) |
| $a(x)$ | light absorption field | spatially-dependent linear attenuation coefficient (mm$^{-1}$) of light absorbed by the resin |
| $\alpha$ | absorption coefficient | linear attenuation coefficient (mm$^{-1}$) of light absorbed by the resin |
| x | x, y, z coordinate | position of a voxel |
| s | ray distance | distance of a light ray from the z-axis |
| $\varphi$ | azimuthal angle | azimuthal angle of the light ray |
| z | z-axis | z-axis coordinate of a light ray |

The CALO system inputs the target geometry $f_T$ (i.e., 3D specification) for the 3D object and outputs the LIF needed to manufacture the target geometry. The target geometry is specified by a 3D data structure in which each data element represents a voxel of the resin within the container. The data elements of the target geometry can have a value of 0 or 1 with 0 representing not part of the 3D object and 1 representing part of the 3D object. The goal of the CALO system is to identify a LIF that is sufficient to provide the energy dose that is needed to cure the resin in the voxels that are part of the object (i.e., with a value of 1) without curing the resin in the other voxels. The energy dose needed to cure the resin is the dose curing threshold $D_c$. The amount of light that a voxel receives is based on the absorption coefficient $\alpha$ of the resin. The absorption coefficient represents the coefficient of the exponential attenuation of the absorbed light energy as it travels through the resin. The CALO system inputs both the dose curing threshold and absorption coefficient. The CALO may also input the rotation rate Q of the rotation stage.

The CALO system employs a minimization technique, such as conjugate gradient descent, to minimize a cost function to determine an LIF for use in manufacturing the object. The cost function is based on the difference between the energy dose received by each voxel and the dose curing threshold. The goal is to have the energy by each voxel that is part of the 3D object to be at or above the dose curing threshold and that is not part of the 3D object to be below the dose curing threshold. The cost function has a minimum cost (indicating an effective LIF) when the difference between the amount of light received by the voxels that are part of the 3D object and the curing threshold is greater than or equal to zero and the difference for all other voxels is less than zero. When the minimization technique identifies an LIF that tends to minimize the cost function, the CALO system outputs the LIF for use in the manufacturing of the 3D object.

The CALO system may employ a cost function defined by the following equation:

$$\hat{g} := \mathrm{argmin}_{0 \leq g \leq M} C(g)$$

$$C(g) = \frac{1}{2} \left\| u\left( \frac{\alpha}{\Omega} R_\alpha^* g - D_c \right) - f_T \right\|^2$$

where C(g) represents the cost function, M represents a scalar value to constrain the maximum light intensity, u is a sigmoid function, and $R_\alpha^* g$ represents the adjoint of the ART $R_\alpha f$. The constraining of the maximum light intensity may reduce the time need to manufacture a 3D object. The sigmoid function is a smooth approximation of a step function that has a value of 1 if the argument is greater than zero and a value of 0 otherwise. Thus, when the energy dose for a voxel is greater than or equal to the dose curing threshold, the value of the sigmoid function is between 0.5 and 1.0. If that voxel is part of the object, the difference between the voxel value of the target geometry and the value of the sigmoid function is between 0.0 and 0.5, which is the minimum cost associated with that voxel.

The ART is represented by the following equation:

$$R_\alpha f(s,\varphi,z) := \int_{\mathbb{R}} f(s\theta(\varphi)+t\theta^\perp(\varphi)+ze_3) e^{-\int_0^\infty \alpha(s\theta(\varphi)+(t+l)\theta^\perp(\varphi)+ze_3)dl} dt$$

$$\theta(\varphi):=(\cos(\varphi),\sin(\varphi),0)^T,$$

$$\theta^\perp(\varphi)):=(-\sin(\varphi),\cos(\varphi),0)^T,$$

$$e_3:=(0,0,1)^T.$$

When the attenuation is constant within the container and zero outside, the light attenuation field may be represented by the following equation:

$$a(x) = \begin{cases} \alpha, & \|x - x \cdot e_3\|_2 < R, \\ 0, & \text{otherwise} \end{cases}$$

The adjoint of the ART, which is an attenuated backprojection, is represented by the following equation:

$$R^*_\alpha g(x) := \int g(x \cdot \theta(\varphi), \varphi, x \cdot e_3) e^{-\int_0^\infty \alpha(x+t\theta^\perp(\varphi))dl} d\varphi$$

The dose $f$ delivered by the light intensity field $g$ is represented by the following equation:

$$f = \frac{\alpha}{\Omega} R^*_a g$$

The CALO system may employ an adjoint of the ERT to simplify the calculation of the adjoint of the ART. The ERT may be represented by the following equation:

$$T_\alpha f(s,\varphi,z) := \int_{\mathbb{R}} f(s\theta(\varphi)+t\theta^\perp(\varphi)+ze_3) e^{\alpha t} dt$$

and the adjoint of the ERT may be represented by the following equation:

$$T^*_\alpha g(x) := \int_0^{2\pi} g(x \cdot \theta(\varphi), \varphi, x \cdot e_3) e^{\alpha x \cdot \theta^\perp(\varphi)} d\varphi$$

The ART is related to ERT by the following equation:

$$R_a f(s, \varphi, z) := \int_{\mathbb{R}} f(s\theta(\varphi) + t\theta^\perp(\varphi) + ze_3) e^{-\int_0^\infty a(s\theta(\varphi)+(t+l)\theta^\perp(\varphi)+ze_3)dl} dt$$

$$= \int_{\mathbb{R}} f(s\theta(\varphi) + t\theta^\perp(\varphi) + ze_3) e^{-\alpha\sqrt{R^2-s^2} + \alpha t} dt$$

$$= e^{-\alpha\sqrt{R^2-s^2}} T_\alpha f(s, \varphi, z).$$

a weight

When the container of resin has a constant absorption coefficient, the CALO system may employ this equation to calculate the ART because it requires fewer computational resources than calculating ART directly. If, however, there is an optically-opaque object inside the container, the CALO system may employ ART with the absorption map have a value of infinity ($\alpha=\infty$) for these voxels to model that a light ray through such a voxel is absorbed by that voxel.

Although ART may be the preferred method when there is an optically-opaque object inside the container, the CALO system may employ ERT modified so that the integral does not include line segments through these inclusions. The modified ERT may be represented by the following equation:

$$T_\alpha f(s,\varphi,z) = \int_{\{t \in \mathbb{R}: s\theta(\varphi)+t\theta^\perp(\varphi)+ze_3 \notin O \cap s\theta(\varphi)+t\theta^\perp(\varphi)+ze_3 \notin O \text{ for } \tau < t\}} f(s\theta(\varphi)+t\theta^\perp(\varphi)=ze_3) e^{\alpha t} dt \quad (1)$$

where O represents the set of occlusions.

The CALO system may allow each voxel of the target geometry to have a weight representing "importance." A high value for the weight indicates that it is important for the voxel in the container have the value defined by the target geometry. For example, if it is important that a certain voxel not be part of the object, the weight for that voxel can be set to 1. To allow for varying importance, the CALO system may represent the cost function by the following equation:

$$C(g) := \frac{1}{2}\left(u\left(\frac{\alpha}{\Omega}R^*_a g - D_c\right) - f_T\right)^T W\left(u\left(\frac{\alpha}{\Omega}R^*_a g - D_c\right) - f_T\right) \quad (2)$$

where W represents a diagonal matrix of the weights.

In some embodiments, the CALO system may employ a rotation rate that varies with projection angle, which may reduce the time needed to manufacture the 3D object. Because the light intensity field has a fixed dynamic range, larger energy doses may require more time to deliver. The CALO system may take advantage of this by increasing the intensities of images and the angular velocity of rotation at angular positions where the highest value of the conventionally designed image is lower than the global maximum of all images. The CALO system may scale up the intensity of the images so that the peak value within each image equals the peak intensity capability of the projection system. The CALO system can then increase rotational velocity associated with each image in proportion to the intensity scale-up factor, so that the dose contributions from each angular position remain the same—or approximately the same—as with a constant rotation. The CALO system can also adjust intensity scale-up factors for systems in which angular acceleration and/or deceleration of rotation has a limited magnitude.

Figure 2B:
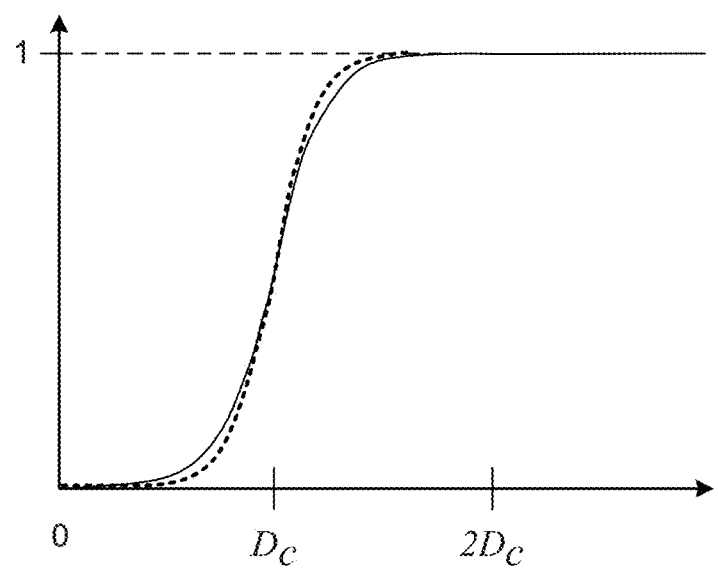

As described above, the CALO system may employ a sigmoid function in the cost function so that u is differentiable and provides a continuous measure for how close or far the delivered dose is to the desired dose. Examples of sigmoid functions may be represented by the following equations:

$$u_1(t) := \frac{1}{1 + e^{-wt}},$$

$$u_2(t) := \begin{cases} 0, & t < -0.5 \\ 2^{w-1}(t+0.5)^w, & -0.5 \le t < 0, \\ 1 - 2^{w-1}(0.5-t)^w, & 0 \le t < 0.5, \\ 1, & 0.5 \le t. \end{cases}$$

where the parameter w>0 controls the sharpness/steepness of the sigmoid function. The two sigmoid functions are closest when $u_2$ uses a value of w that is one quarter the value of that used in $u_1$. FIGS. 2A and 2B illustrate plots of $u_1$ and $u_2$. The dashed lines represent $u_1$, and the solid lines represent $u_2$. FIG. 2B represents a larger value for w than FIG. 2A. The sharpness of the sigmoid function may have a significant effect on the result. The sharpness of the sigmoid function is inversely proportional to the sharpness of the delivered dose. A sharper dose will have a steep gradient across the boundary surface. This may be illustrated by when estimating the ideal light intensity map represented by the following relationship:

$$\frac{\alpha}{\Omega}R_a^*g(x) = 0.25D_c$$

Given this relationship, the sigmoid functions of FIG. 2A will have a larger error than those of FIG. 2B. Thus, a smaller value of w will drive the delivered dose down more than using a larger value. The sigmoid functions have several differences. The sigmoid function $u_1$ is always between zero and one, but never reaches either value. In contrast, sigmoid function $u_2$ has the value of 0 for a dose less than or equal to −0.5 and a value of 1 for a dose greater than or equal to 0.5. The sigmoid function $u_1$ has the characteristic that, no matter how high the delivered dose in the target geometry, the cost function will continue to drive the dose higher in these regions and the conversely for regions outside the target geometry. Because of this characteristic, sigmoid function $u_2$ may be preferred over sigmoid function $u_1$. The CALO system may employ functions other than sigmoid function to represent u. Such functions include other functions that approximate the step function and that are differentiable.

To simplify the description of the following equations, c is defined as $c=\Omega/\alpha D_c$. Using this definition, the cost function and the gradient and Hessian of the cost function are represented by the following equations:

$$C(g):=\tfrac{1}{2}(u(R_\alpha g-c)-f_T)W(u(R^*_\alpha g-c)-f_T)$$

$$C'(g)=R_\alpha W[(u(R^*_\alpha g-c)-f_T)u'(R^*_\alpha g-c)],$$

$$C''(g)=R_\alpha W[(u(R^*_\alpha g-c)-f_T)u''(R^*_\alpha g-c)+(u'(R^*_\alpha g-c))^2]R^*_\alpha.$$

In some embodiments, the CALO system may solve for the LIF using a constrained conjugate gradient ("CCG") technique a represented by the following equations:

$$g_{n+1}:=\max(0,\min(g_n+\lambda_n^+ d_n,M)),$$

$$d_n:=-C'(g_n)+\frac{\|C'(g_n)\|^2}{\|C'(g_{n-1})\|^2}d_{n-1},$$

$$d_0:=-C'(g_0).$$

where $\lambda_n^+$ represents the step size. To find the step size, the CALO system solves (e.g., using backtracing or a golden section search) the following equations:

$$\lambda_n^+:=\mathrm{argmin}_{0<\lambda\leq\lambda_n}C(\max(0,\min(g_n+\lambda d_n,M))),$$

$$\lambda_n:=-\frac{\langle d_n,C'(g_n)\rangle}{\langle R_a^* d_n,W\bigl[(u(R_a^* g_n-c)-f_T)u''(R_a^* g_n-c)+(u'(R_a^* g-c))^2\bigr]R_a^* d_n\rangle}.$$

The Taylor series estimate of the ideal step size is only valid when the cost function is locally convex. However, the cost function is not globally convex. Thus, the CCG technique may not converge unless the initial estimate $g_0$ is good. The CALO system may calculate the initial estimate as represented by the following equations:

$$g_0:=k(z)\tilde{g}_0$$

$$\tilde{g}_0:=\frac{1}{R_a 1}R_a\left[\frac{D_c f_T}{R_a 1}\right]$$

$$k(z):=\frac{\Omega}{\alpha}\frac{\sum_{\partial(z)} R_a^*\tilde{g}_0}{\sum_{\partial(z)}(R_a^*\tilde{g}_0)^2}$$

where $\partial(z)$ is the boundary of the target geometry in the x-y plane with height z. The initial estimate is a weighted backprojection. The CALO system derives the weights based on a Simultaneous Algebraic Reconstruction Technique ("SART"). SART is typically employed in CT when determining the geometry of an object from collected images. The CALO system employs the SART in the reverse direction to determine the initial LIF given the 3D geometry of the 3D object. The CALO system also applies a slice-by-slice normalization factor to optimize the LIF so that the delivered dose at boundary is equal to the dose curing threshold.

As described above, the CALO system determines an LIF that delivers a dose high enough to cure resin for a target geometry. The CALO system, however, does not enforce how this dose is distributed. For example, it does not try to deliver a uniform distribution of dose inside the target geometry. In some embodiments, the CALO system may enforce a soft constraint to enforce dose uniformity based on a cost function represented by the following equation:

$$C_\beta(g):=C(g)+\beta S(R^*_\alpha g)$$

where $S(f)$ represents a Total Variation (TV) functional or similar regularizer. Larger values of $\beta$ will produce dose maps that are smoother but retain sharp piece-wise jump discontinuities (between the cured and non-cured portions). The gradient and Hessian of this cost function are represented by the following equations:

$$C'_\beta(g)=C'(g)+\beta R_\alpha S'(R^*_\alpha g)$$

$$C''_\beta(g)=C''(g)+\beta R_\alpha S''(R^*_\alpha g)R^*_\alpha$$

As described above, the CALO system (as do prior computed axial lithography techniques) implicitly assumes proportionality between illumination intensity and the rate of consumption of inhibitor species, and also proportionality between intensity and polymerization rate once the inhibition-imposed dose threshold has been exceeded. If these assumptions are justified, the design of the LIF can be carried out simply by considering the spatial distribution of energy dose, which is the result of attenuated projecting of the LIF, or one of its variants. However, free radical photopolymerization is often not well described by such proportional relationships; instead, reaction rates show a sub-linear dependence on intensity.

This nonlinear dependence, once characterized, can be compensated for by a modification of LIF that was previously designed with existing techniques. If the relevant material transformation rate, R, for a particular stage of the printing process (either depletion of inhibitor or polymerization) can be described by the exponential relationship $R=kI^\gamma$ where $\gamma<1$ and k is a material-dependent constant, The compensation technique may be:

Raise to the power (1/γ) each element of the gLIF that have been designed using a computed axial lithography technique that assumes proportionality between conversion and dose.

Re-scale all elements of $g^{1/\gamma}$ by a single factor that is calculated such that the peak intensity to be backprojected across all sample positions equals the highest intensity achievable with the apparatus.

This compensation technique assumes that the kinetics of the material response are fast enough in relation to the rotation rate of the system so that the material conversion rate depends only on the instantaneous intensity reaching that material. The advantage of this compensation technique is that nonlinear material response does not need to be incorporated into the computed axial lithography optimization technique. As a result, an LIF can be reused multiple times with minimal post-optimization adjustment for each material. Such a compensation technique can both reduce computational resources resulting faster overall manufacturing.

The exponents that govern the relationships between illumination intensity and inhibitor depletion rate and between intensity and polymerization rate are likely to be different from each other in any given resin. In addition, the relevant exponent may well change gradually over time as the inhibitor becomes depleted. The CALO system may account for these to improve the quality of a 3D object. The CALO system assumes the resin can be illuminated in several consecutive phases, where the set of images differs in each phase. For example, in the first (inhibitor depletion) phase, the CALO system may raise the LIF to the power $\gamma_1^{-1}$, where $\gamma_1$ describes the kinetics of inhibitor depletion. For this phase, the CALO system selects a duration to allow the inhibitor concentration to fall to a level where the polymerization rate began to accelerate appreciably. The CALO system then switches the LIF to $g\gamma_2^{-1}$ the power, where $\gamma_2$ describes the polymerization process. The CALO system employ many values of γ at different times during manufacturing.

The CALO system can be used to manufacture geometries that are delicate structures such as thin-walled tubes. Prior computed axial lithography may not result in the strongest possible dose contrast between the walls of a tube and the intended void inside the tube. Such insufficient contrast may restrict the smallest printable feature, constrain the range of printable materials, result in tacky (partially converted) surfaces, or have other deleterious side-effects.

To help avoid insufficient contrast, the CALO system may determine a LIF to avoid delivering any dose to the intended void region. As an example, a geometry may be cylindrical tube with internal radius, $r_i$, and external radius, $r_o$, whose axis coincides with the rotation axis of a container. In this example, the LIF is a function only of transverse position across the projector and does not change with time. Such an LIF may thus be represented as I(r) where r is the transverse position. The light intensity field is constrained to be non-zero only in the range $r_i \leq r \leq r_o$ such that no dose is delivered to the internal void.

The delivered dose at x=ρθ(ψ) (expressed in polar coordinates) is represented by the following equation:

$$D(\rho\theta(\psi)) = \frac{1}{\Omega}\int_0^{2\pi} I(\rho\theta(\psi)\cdot\theta(\varphi))d\varphi$$

-continued $$= \frac{1}{\Omega}\int_0^{2\pi} I(\rho\cos(\psi-\varphi),\varphi)d\varphi$$

$$= \frac{1}{\Omega}\int_0^{2\pi} I(\rho\cos\varphi)d\varphi$$

$$= \frac{1}{\Omega}\int_{-\rho}^{\rho} I(r)\frac{1}{\rho\sin\varphi}dr$$

$$= \frac{1}{\Omega}\int_{-\rho}^{\rho} I(r)\frac{1}{\sqrt{\rho^2-r^2}}dr$$

where the absorption coefficient is 0, the dependence on z is dropped, the object is constant in z, and r=ρ cos φ.

Unfortunately, any exact solution will have a singularity at $I(r_i)$ because material at $\rho=r_i$ would be illuminated for a vanishingly small length of time. To provide an approximate solution, the CALO system may solve numerically for I(r) while only imposing the constraint that $D(\rho)=D_c$ over the range $r_i=\varepsilon \leq \rho \leq r_o$, where, for example, $\varepsilon << r_i$. In this way, although the dose distribution would not exhibit a perfectly sharp transition at the inner wall, the transition region of properties could be limited in thickness. Moreover, because the solution for I(r) is expected to be much larger nearer the inner wall than at the outer wall, there is a trade-off between the desirable attributes of high dose uniformity and short manufacturing time. Earlier curing could be attained at the expense of some dose uniformity, while maintaining a zero dose within the central void of the tube. The CALO system may address this trade-off by illuminating the material with a weighted superposition of the (approximate) solution for uniform dose, $\hat{I}(r)$, with a uniform intensity in the range $r_i \leq r \leq r_o$. The CALO system may employ a possible intensity distribution as represented by the following equation:

$$I_1(r)=k_1\hat{I}(r)+k_2(H(r-r_i)-H(r-r_o))$$

where H(•) represents the Heaviside step function and $k_1$ and $k_2$ represent weighting coefficients. The CALO system may employ similar solutions for off-center tubes or tubes with other angular orientations.

In some embodiments, the CALO system effectively increases the dynamic range of the projector using multiple rotations of the container. The dynamic range of a projector describes the number of discrete light intensity levels that can be displayed. For example, if the projector is a digital device with 8 bits per pixel, its bit-depth m is 8. This device can project $2^m$ or 256 intensity levels for every pixel, with a maximum grayscale value of 255 $2^m-1$ and a minimum of 0. These grayscale values provide scaling factors on the maximum physical irradiance (in units of flux per unit area, denoted by $I_{MAX}$), referred to as the maximum intensity, that the projector outputs. When determining a light intensity field, the CALO system factors in both the projector's maximum intensity and the number of discrete levels that can be projected.

The CALO system can increase the effective dynamic range using multiple rotations with the number of rotations represented as $N_{ROT}$. When the same image is projected during each rotation, the effective maximum intensity that can be delivered is $N_{ROT}*I_{MAX}$, but the number of discrete intensity levels that can be delivered is still only $2^m$. However, by varying the images projected during each rotation, the total number of discrete levels that can be delivered increases to $N_{ROT}(2^m-1)+1$, with a maximum relative intensity of $N_{ROT}(2^m-1)$. The effective dynamic range is thereby multiplied by approximately the number of rotations. For example, for four rotations the CALO system generates a light intensity field with a maximum grayscale value of 1020 ($4*(2^8-1)$).

The CALO system may calculate the initial grayscale value (or intensity) for each pixel with a resolution that is appropriate to the datatype used to represent the intensity and then map the initial grayscale values to the number of discrete intensity levels that are available based on the number of rotations to generate a multi-rotation light intensity field. For example, if the datatype is a 32-bit unsigned integer, the resolution has $2^{32}$ discrete initial grayscale values. The CALO system then maps the initial grayscale values to the $N_{ROT}(2^m-1)+1$ discrete intensities available to represent the effective dynamic range when projecting varying images during multiple rotations.

With an 8-bit digital projector, during each rotation, the grayscale value of each pixel can increase by a maximum of 255. Thus, for four rotations, the maximum aggregate intensity possible for a pixel is 1020 (255*4)—that is set to maximum grayscale value for each rotation.

The CALO system can achieve the intensity for a pixel by setting the grayscale values for the pixel in each rotation so that they sum to that intensity. So, an intensity of 4 can be represented by value of 1 during each rotation; or a value of 1 for two rotations, 2 for one rotation, and 0 for one rotation; or a value of 2 for two rotations; and so on.

In some embodiments, the CALO system may set a value for a pixel during the minimum number of rotations needed to represent the intensity for that pixel. For example, if the intensity is 256, the CALO system may set the value for the pixel to 0 for the first and second rotations, 1 during the third rotation, and 255 during the fourth rotation. As another example, if the intensity is 1019, the CALO system may set the value for the pixel to 254 during the first rotation and 255 during the second, third, and fourth rotations.

Depending on the characteristics of the resin, the CALO system may select different orderings of when a pixel is set to the maximum value of 255. For example, the CALO system may defer the setting of values to the maximum value to the latest possible rotations. In such a case, if the intensity is 254, the CALO system sets the value to 0 for the first, second, and third rotations and 254 for the fourth rotation. If the intensity is 256, the CALO system sets the value to 0 for the first and second rotations, 1 for the third rotation, and 255 for the last rotation. If the intensity is 511, the CALO system sets the value to 0 for the first rotation, 1 for the second rotation, and 255 for the third and fourth rotations. The CALO system may also set the intensities of a pixel of an image the multi-rotation light intensity field so that the intensities are projected in order starting with the lowest intensity in the first rotation so that highest intensity is projected in the last rotation.

In some embodiments, the CALO system may be used in applications, other than in manufacturing using computed axial lithography, where the amount of energy to be delivered to voxels both within and outside of a target volume is to be controlled. The CALO system may be used to determine a LIF for projecting onto a target volume with a known 3D geometry irrespective of the reason for doing so. The reasons may include deactivating a property of the object, controlling a chemical reaction within a target volume, destroying an object, and so on. For example, the CALO system may be used to determine a LIF for projecting onto an object (or more generally a volume) within an organism such as a tumor or an organ, within a vehicle, within a container (e.g., carry-on baggage), and so on. More generally, the CALO system may be employed to determine a LIF for projecting onto a volume of any shape and size. The wavelength of the light to be projected on a target volume may depend on the application. For example, an appropriate wavelength may be around 400 nm for computed axial lithography.

The CALO system as described herein determines a LIF assuming the projector sends out a parallel beam. For projectors that send out a cone beam (e.g., DLP projectors), the parallel beam assumption provides a reasonable approximation of a cone beam especially when the projector is far from the target volume. When far from the target volume, the spread of the cone beam may be relatively small. The components of the CALO system may also be adapted to factor in the spread of a cone beam.

Figure 3:
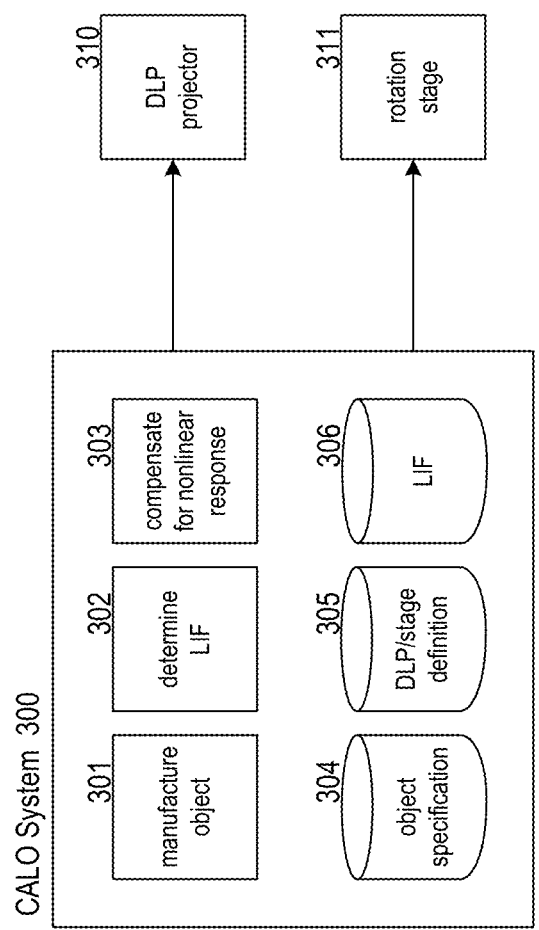
FIG. 3 is a block diagram illustrating components of the CALO system in some embodiments.

FIG. 3 is a block diagram illustrating components of the CALO system in some embodiments. The CALO system 300 is connected to a DLP projector 310 and a rotation stage 311. The CALO system includes a manufacture object component 301, a determine light intensity field component 302, and a compensate for nonlinear response component 303. The CALO system also includes an object specification store 304, a DLP/stage definition store 305, and a light intensity field store 306. The object specification store stores the specification of the object to be manufactured including the target geometry and specifications relating to the material such as absorption coefficient. The DLP/stage definition store stores the definition of the DLP projector, such as maximum intensity of the projector and number of pixels, and the definition of the rotation stage such as maximum rotation rate. The light intensity field store stores a light intensity field for use in manufacturing of the object that is specified in the object specification store. The manufacture object component controls the determining of the light intensity field for using in manufacturing the object and outputting the light intensity field to the DLP for the manufacture of the object.

The computing systems (e.g., nodes) on which the CALO system may be implemented may include a central processing unit, input devices, output devices (e.g., display devices and speakers), storage devices (e.g., memory and disk drives), network interfaces, graphics processing units, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing systems may include desktop computers, laptops, tablets, e-readers, personal digital assistants, smartphones, gaming devices, servers, and so on. The computing systems may access computer-readable media that include computer-readable storage media (or mediums) and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on it or may be encoded with computer-executable instructions or logic that implements the CALO system. The data transmission media is used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting data using the keys.

The CALO system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various embodiments. Aspects of the CALO system may be implemented in hardware using, for example, an application-specific integrated circuit (ASIC) or field programmable gate array ("FPGA").

Figure 4:
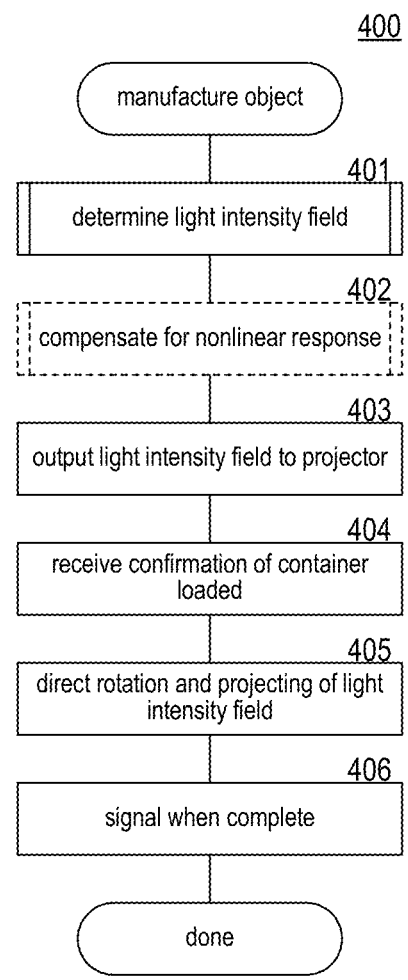
FIG. 4 is a flow diagram illustrating the processing of the manufacture object component of the CALO system in some embodiments.

FIG. 4 is a flow diagram illustrating the processing of the manufacture object component of the CALO system in some embodiments. The manufacture object component 400 is invoked when an object is to be manufactured in accordance with the object specification. In block 401, the component invokes a determine light intensity field component to determine the light intensity field to use when manufacturing object. In block 402, the component optionally invokes a compensate for nonlinear response component to compensate the light intensity field for the nonlinear response of the material transformation rate to the light intensity. In block 403, the component outputs the light intensity field to the DLP projector. In block 404, the component may receive a confirmation that the container with the material has been loaded onto the rotation stage. In block 405, the component directs the start of the rotation and projecting of the light intensity field. In block 406, when the manufacture complete, the component outputs a completion signal and then completes.

Figure 5:
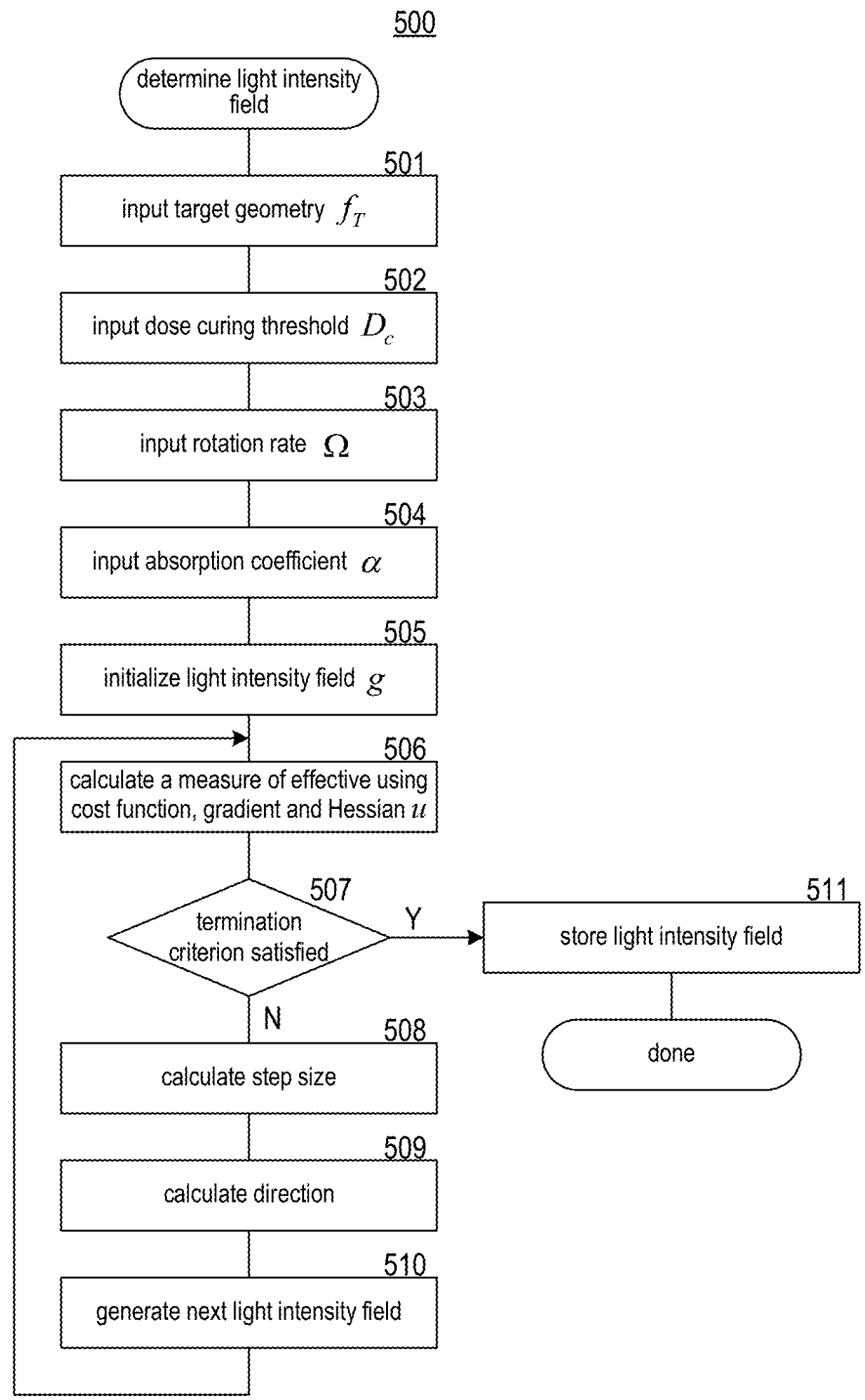
FIG. 5 is a flow diagram that illustrates the processing of a determine light intensity field component of the CALO system in some embodiments.

FIG. 5 is a flow diagram that illustrates the processing of a determine light intensity field component of the CALO system in some embodiments. The determine light intensity field 500 is invoked to determine the light intensity field to use in the manufacturing of the object. In block 501, the component inputs a target geometry for the object. In block 502, the component inputs a dose curing threshold for the material that the object is to be made out of. In block 503, the component inputs the rotation rate of the rotation stage. In block 504, the component inputs an absorption coefficient for the material. In block 505, the component initializes a light intensity field. In blocks 506-510 the component loops performing a minimization of the cost function to determine the light intensity field to use in the manufacturing of the object. In block 506, the component calculates a measure of the effectiveness of the current light intensity field using the cost function and its gradient and Hessian. In decision block 507, if a termination criterion is satisfied, then the component continues at block 511, else the component continues at block 508. The termination criterion may be, for example, based on several of the last iterations resulting in no appreciable difference in the cost or that a threshold cost has been reached. In block 508, the component calculates a step size for the descent. In block 509, the component calculates the direction for the descent. In block 510, the component generates a next light intensity field based on the step size and direction and loops to block 506 to calculate a measure of effectiveness for that light intensity field. In block 511, the component stores the light intensity field in the light intensity field store and completes.

Figure 6:
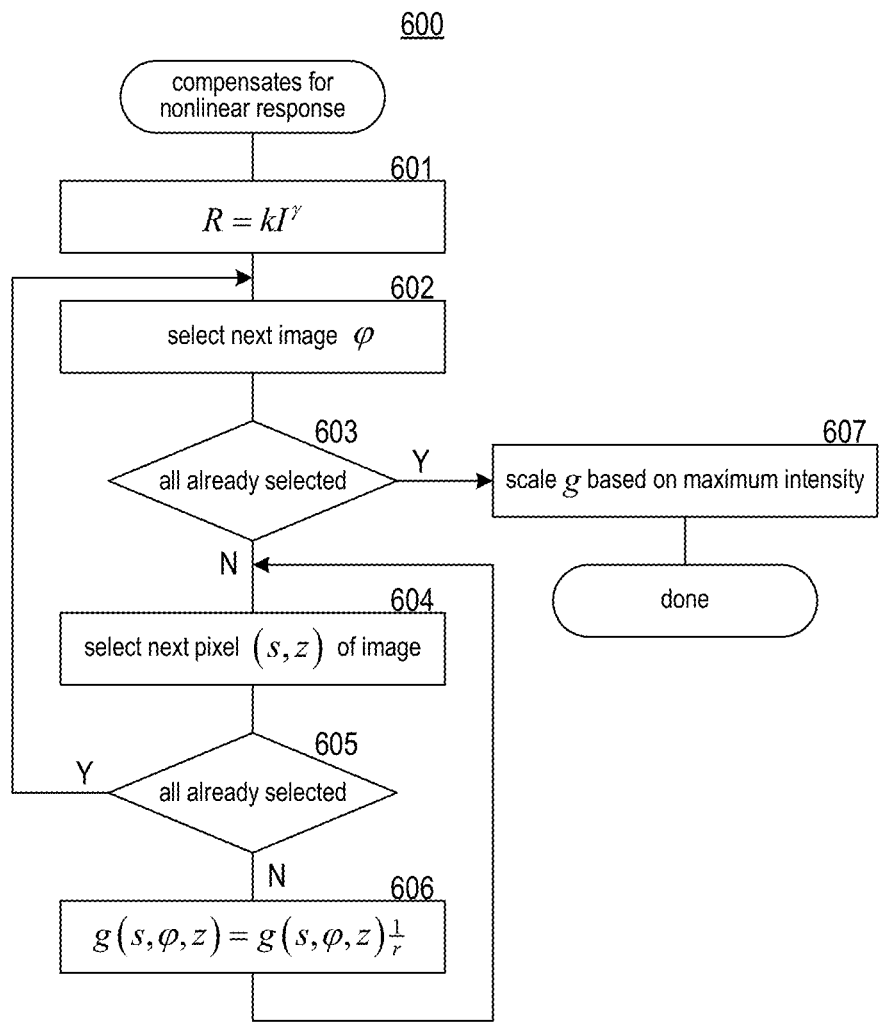
FIG. 6 is a flow diagram that illustrates the processing of a compensate for nonlinear response component of the CALO system in some embodiments.

FIG. 6 is a flow diagram that illustrates the processing of a compensate for nonlinear response component of the CALO system in some embodiments. The compensate for nonlinear response component 600 adjusts the light intensity field of the light intensity field store to compensate for nonlinear response of the material transformation rate. In block 601, the component accesses a power and factor defining the rate. In block 602-606, the component loops adjusting the light intensities of each pixel of each image of the light intensity field based on the rate. In block 602, the component selects the next image of light intensity field. In decision block 603, if all the images have already been selected, then the component completes at 607, else the component continues at block 604. In block 604, the component selects the next pixel of the image. In decision block 605, if all the pixels of already been selected, then the component loops to block 602 to select the next image, else the component continues at block 606. In block 606, the component adjusts the light intensity of the pixel based on the power of the rate and then loops to block 604 to select the next pixel. In block 607, the component scales the light intensity field based on the maximum intensity the DLP projector and then completes.

The following paragraphs describe various embodiments of aspects of the CALO system. An implementation of the CALO system may employ any combination of the embodiments. The processing described below may be performed by a computing device with a processor that executes computer-executable instructions stored on a computer-readable storage medium that implements the CALO system.

In some embodiments, a method performed by one or more computing systems for determining a light intensity field for use in manufacturing a 3D object from a volume of material is provided. The material is photoreactive and hase a dose curing threshold indicating energy dose that results in curing material. The method receives a 3D specification of a 3D geometry for the 3D object that specifies voxels within the volume of material that are to be part of the 3D object. The method accesses a specification of a cost function for generating a measure of effectiveness of a light intensity field in manufacturing the 3D object. The cost function is based on an adjoint of an Attenuated Radon Transform (ART) that models an energy dose that each voxel would receive in manufacturing the 3D object based on the light intensity field. The method determines a light intensity field for use in manufacturing the 3D object by applying an optimization technique that employs the cost function to generate a measure of effectiveness of possible light intensity fields and that identifies based on the measures of effectiveness a light intensity field for use in in manufacturing 3D object. The method outputs an indication of the light intensity field. In some embodiments, the measure of effectiveness is based on voxels that are to be part of the 3D object having an energy dose at or above the dose curing threshold and voxels that are not to be part of the 3D object having an energy dose below the dose curing threshold. In some embodiments, the 3D specification includes a value of 1 for voxels that are to be part of the 3D object and a value of 0 for voxels that are not to be part of the 3D object. In some embodiments, the 3D specification includes a value of 1 for voxels that are to be part of the 3D object and a value of 0 or less for voxels that are not to be part of the 3D object wherein a magnitude of a value less than 0 for a voxel indicates the voxel is to have an energy dose that is as possible when manufacturing the 3D object. In some embodiments, the dose curing threshold is different for at least two voxels. In some embodiments, the adjoint of the ART is expressed in terms of an adjoint of an Exponential Radon Transform. In some embodiments, the cost function is differentiable. In some embodiments, the cost function factors in an importance of a voxel in being part of the 3D object. In some embodiments, the cost function is based on a rotation rate of the volume relative to a projector that projects the light intensity field. In some embodiments, the rotation rate is constant. In some embodiments, the rotation rate is variable. In some embodiments, the applying of the optimization technique includes constraining the light intensity field based on a maximum energy dose. In some embodiments, the ART is further based on a light absorption coefficient of the material expressed as a light absorption field with a value for each voxel. In some embodiments, the method further includes, when an optically-opaque object is included within the material, setting the value of the light absorption field for voxels with the optically-opaque object to indicate that a light ray in a direction of a voxel of the optically-opaque object is absorbed by the material within that voxel. In some embodiments, the cost function includes a regularizer to control uniformity of energy dose within the voxels that are part of the 3D object. In some embodiments, the regularizer is a total variation function. In some embodiments, the method further comprises compensating non-linear response of a material transformation rate to energy by representing the material transformation rate as energy raised to a transformation power that is less than one and raising light intensities of the light intensity field to one over the transformation power and rescaling the light intensities based on a maximum light intensity. In some embodiments, the method further comprises generating an initial light intensity field for use by the optimization technique based on a weighted projection. In some embodiments, the method further comprises determining weights for the weighted projection using a Simultaneous Algebraic Reconstruction technique to generate the initial light intensity field from the 3D geometry of the 3D object. In some embodiments, the light intensity field includes images to be projected during one rotation of the volume of the material relative to a projector projecting the images. In some embodiments, the method further comprising generating from the light intensity field a multi-rotation light intensity field to be projected by a projector during multiple rotations of the volume of the material relative to the projector to generate an effective dynamic range that is greater than a dynamic range of the projector wherein the light intensity field is determined based on the effective dynamic range. In some embodiments, a pixel of the multi-rotation light intensity field is set to a maximum intensity of the projector during one or more rotations to generate an effective intensity level that is outside the dynamic range. In some embodiments, the intensities of a pixel of an image the multi-rotation light intensity field are in order starting with the lowest intensity so that highest intensity is projected in the last rotation. In some embodiments, the light intensity field includes images and further comprising controlling a device to project images of the light intensity field on to the volume of material. In some embodiments, the device includes a projector and a stage, the stage holds the volume of the material. In some embodiments, in the projector is stationary and the stage rotates. In some embodiments, the stage is stationary and the projector revolves around the stage. In some embodiments, the outputting sends the light intensity field to the device.

In some embodiments, one or more computing systems that determines a light intensity field are provided. The one or more computing system includes one or more computer-readable storage mediums storing computer-executable instructions for controlling the one or more computing systems and one or more processors for executing the computer-executable instructions stored in the one or more computer-readable storage mediums. The instructions access a 3D specification of a 3D geometry. The instructions apply an optimization technique that employs a cost function to generate a measure of an effectiveness of possible light intensity fields in delivering desired energy doses to portions within the 3D geometry. The cost function being based on an adjoint of an Attenuated Radon Transform (ART) that models energy doses delivered to the portions of the 3D geometry by a possible light intensity field. The light intensity field represents images for projecting onto the portions of the 3D geometry. The instructions select a light intensity field of the possible light fields based on the measures of effectiveness of the possible light intensity fields. The instructions output an indication of the selected light intensity field. In some embodiments, the 3D specification specifies voxels of a volume of material that are to be part of a 3D object having the 3D geometry. In some embodiments, the measure of effectiveness is based on voxels that are to be part of the 3D object having a dose at or above a dose curing threshold of the material and voxels of the volume of material that are not to be part of the 3D object having a dose below the dose curing threshold. In some embodiments, the dose curing threshold is different for at least two voxels. In some embodiments, the 3D specification includes a value of 1 for voxels that are to be part of the 3D object and a value of 0 for voxels that are not to be part of the 3D object. In some embodiments, the 3D specification includes a value of 1 for voxels that are to be part of the 3D object and a value of 0 or less for voxels that are not to be part of the 3D object wherein a magnitude of a value less than 0 for a voxel indicates value of the voxel having as low a dose as possible. In some embodiments, the adjoint of the ART is expressed in terms of an adjoint of an Exponential Radon Transform. In some embodiments, the cost function factors in importance of a voxel in being part of the 3D object. In some embodiments, the cost function is based on rotation rate of the volume relative to a projector that projects the light intensity field. In some embodiments, the rotation rate is constant. In some embodiments, the rotation rate is variable. In some embodiments, the computer-executable instructions that apply of the optimization technique constrain the light intensity field based on a maximum energy dose. In some embodiments, the ART is further based on a light absorption coefficient of the material expressed as a light absorption field with a value for each voxel. In some embodiments, when an optically-opaque object is included within the volume of material, the instructions set the value of the light absorption field for voxels with the optically-opaque object to indicate that a light ray in a direction of a voxel of the optically-opaque object is absorbed by the material within that voxel. In some embodiments, the cost function includes a regularizer to control uniformity of dose within the voxels that contain material to be part of the 3D object. In some embodiments, the instructions further compensate non-linear response of a material transformation rate to energy by representing the material transformation rate as energy raised to a transformation power that is less than one and raising light intensities of the light intensity field to one over the transformation power and rescaling the light intensities based on a maximum light intensity. In some embodiments, the computer-executable instructions generate an initial light intensity field for use by the optimization technique based on a weighted projection. In some embodiments, the computer-executable instructions determine weights for the weighted projection using a Simultaneous Algebraic Reconstruction technique to generate the initial light intensity field from the 3D geometry of the 3D object. In some embodiments, the light intensity field includes images to be projected during one rotation of the volume of the material relative to a projector projecting the images. In some embodiments, the instructions generate from the light intensity field a multi-rotation light intensity field to be projected by a projector during multiple rotations of the volume of the material relative to the projector to generate an effective dynamic range that is greater than a dynamic range of the projector wherein the light intensity field is determined based on the effective dynamic range. In some embodiments, a pixel of the multi-rotation light intensity field is set to a maximum intensity of the projector during one or more rotations to generate an effective intensity level that is outside the dynamic range. In some embodiments, the intensities of a pixel of an image the multi-rotation light intensity field are projected in order starting with the lowest intensity so that highest intensity is projected in the last rotation. In some embodiments, the light intensity field includes images and further comprising controlling a device to project images of the light intensity field on to a 3D object having the 3D geometry. In some embodiments, the device includes a projector and a stage, the stage holds the 3D object. In some embodiments, the projector is stationary and the stage rotates. In some embodiments, the stage is stationary and the projector revolves around the stage. In some embodiments, the computer-executable instructions that output send the light intensity field to the device. In some embodiments, the computer-executable instructions that apply the optimization technique constrain the light intensity field to a maximum energy dose. In some embodiments, the cost function includes a regularizer to control uniformity of energy dose within the 3D geometry. In some embodiments, the 3D geometry represents an existing 3D object. In some embodiments, the 3D object is within a volume. In some embodiments, the volume is a body of an organism. In some embodiments, when a projector for projecting the light intensity field is a parallel beam projector, the cost function generates a measure of effectiveness of a light intensity field based on projected light rays being parallel. In some embodiments, when a projector for projecting the light intensity field is cone beam projector, the cost function generates a measure of effectiveness of a light intensity field based on projected light rays having a cone-shaped spread. In some embodiments, when a projector for projecting the light intensity field is cone beam projector, the cost function generates a measure of effectiveness of a light intensity field based on projected light rays approximated as being parallel. In some embodiments, the 3D specification specifies voxels of a volume of material that are to be part of a 3D object having the 3D geometry and wherein the computer-executable instructions further include instructions to compensate for non-linear response of a material transformation rate to energy by representing the material transformation rate as energy raised to a transformation power that is less than one and raising light intensities of the light intensity field to one over the transformation power and rescaling the light intensities based on a maximum light intensity wherein the transformation power varies during different phases of the transformation. In some embodiments, the phases include an inhibitor depletion phase and a polymerization phase.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method performed by one or more computing systems for determining a light intensity field for use in manufacturing a 3D object from a volume of material, the material being photoreactive and having a dose curing threshold indicating energy dose that results in curing material, the method comprising:
   receiving a 3D specification of a 3D geometry for the 3D object, the 3D specification specifying voxels within the volume of material that are to be part of the 3D object;
   accessing a specification of a cost function for generating a measure of effectiveness of a light intensity field in manufacturing the 3D object, the cost function being based on a sigmoid function and an adjoint of an Attenuated Radon Transform (ART) that models an energy dose that each voxel would receive in manufacturing the 3D object based on the light intensity field;
   determining a light intensity field for use in manufacturing the 3D object by applying an optimization technique that employs the cost function to generate a measure of effectiveness of possible light intensity fields and that identifies based on the measures of effectiveness a light intensity field for use in in manufacturing 3D object;
   outputting an indication of the light intensity field; and
   controlling a device to project images of the light intensity field onto the volume of material.

2. The method of claim 1 wherein the measure of effectiveness is based on voxels that are to be part of the 3D object having an energy dose at or above the dose curing threshold and voxels that are not to be part of the 3D object having an energy dose below the dose curing threshold.

3. The method of claim 1 wherein the 3D specification includes a value of 1 for voxels that are to be part of the 3D object and a value of 0 for voxels that are not to be part of the 3D object.

4. The method of claim 1 wherein the 3D specification includes a value of 1 for voxels that are to be part of the 3D object and a value of 0 or less for voxels that are not to be part of the 3D object wherein a magnitude of a value less than 0 for a voxel indicates the voxel is to have an energy dose that is as low as possible when manufacturing the 3D object.

5. The method of claim 1 wherein the dose curing threshold is different for at least two voxels.

6. The method of claim 1 wherein the adjoint of the ART is expressed in terms of an adjoint of an Exponential Radon Transform.

7. The method of claim 1 wherein the cost function factors in an importance of a voxel in being part of the 3D object.

8. The method of claim 1 wherein the cost function is based on a rotation rate of the volume relative to a projector that projects the light intensity field.

9. The method of claim 8 wherein the rotation rate is constant.

10. The method of claim 8 wherein the rotation rate is variable.

11. The method of claim 1 wherein the applying of the optimization technique includes constraining the light intensity field based on a maximum energy dose.

12. The method of claim 1 wherein the ART is further based on a light absorption coefficient of the material expressed as a light absorption field with a value for each voxel.

13. The method of claim 12 wherein when an optically-opaque object is included within the material, setting the value of the light absorption field for voxels with the optically-opaque object to indicate that a light ray in a direction of a voxel of the optically-opaque object is absorbed by the material within that voxel.

14. The method of claim 1 wherein the cost function includes a regularizer to control uniformity of energy dose within the voxels that are part of the 3D object.

15. The method of claim 14 wherein the regularizer is a total variation function.

16. The method of claim 1 further comprising compensating non-linear response of a material transformation rate to energy by representing the material transformation rate as energy raised to a transformation power that is less than one and raising light intensities of the light intensity field to one over the transformation power and rescaling the light intensities based on a maximum light intensity.

17. The method of claim 1 further comprising generating an initial light intensity field for use by the optimization technique based on a weighted projection.

18. The method of claim 1 wherein the light intensity field includes images to be projected during one rotation of the volume of the material relative to a projector projecting the images.

19. The method of claim 1 further comprising generating from the light intensity field a multi-rotation light intensity field to be projected by a projector during multiple rotations of the volume of the material relative to the projector to generate an effective dynamic range that is greater than a dynamic range of the projector wherein the light intensity field is determined based on the effective dynamic range.

20. The method of claim 19 wherein a pixel of the multi-rotation light intensity field is set to a maximum intensity of the projector during one or more rotations to generate an effective intensity level that is outside the dynamic range.

21. The method of claim 20 wherein the intensities of a certain pixel of the images of the multi-rotation light intensity field are in order starting with the lowest intensity so that the highest intensity is projected in the last rotation.

22. The method of claim 1 wherein the light intensity field includes images.

23. The method of claim 22 wherein the device includes a projector and a stage, the stage holds the volume of the material.

24. The method of claim 23 wherein the projector is stationary and the stage rotates.

25. The method of claim 23 wherein the stage is stationary and the projector revolves around the stage.

26. The method of claim 22 wherein the outputting sends the light intensity field to the device.

27. One or more computing systems that determines a light intensity field, the one or more computing system comprising:
one or more non-transitory computer-readable storage mediums storing computer-executable instructions for controlling the one or more computing systems to:
access a 3D specification of a 3D geometry;
apply an optimization technique that employs a cost function to generate a measure of an effectiveness of possible light intensity fields in delivering desired energy doses to portions within the 3D geometry, the cost function being based on a sigmoid function and an adjoint of an Attenuated Radon Transform (ART) that models energy doses delivered to the portions of the 3D geometry by a possible light intensity field, the light intensity field representing images for projecting onto the portions of the 3D geometry;
select a light intensity field of the possible light intensity fields based on the measures of effectiveness of the possible light intensity fields;
output an indication of the selected light intensity field; and
controlling a device to project images of the light intensity field onto the volume of material; and
one or more processors for executing the computer-executable instructions stored in the one or more computer-readable storage mediums.

28. The one or more computing systems of claim 27 wherein the 3D specification specifies voxels of a volume of material that are to be part of a 3D object having the 3D geometry.

29. The one or more computing systems of claim 28 wherein the measure of effectiveness is based on voxels that are to be part of the 3D object having a dose at or above a dose curing threshold of the material and voxels of the volume of material that are not to be part of the 3D object having a dose below the dose curing threshold.

30. The one or more computing systems of claim 29 wherein the dose curing threshold is different for at least two voxels.

31. The one or more computing systems of claim 28 wherein the 3D specification includes a value of 1 for voxels that are to be part of the 3D object and a value of 0 for voxels that are not to be part of the 3D object.

32. The one or more computing systems of claim 28 wherein the 3D specification includes a value of 1 for voxels that are to be part of the 3D object and a value of 0 or less for voxels that are not to be part of the 3D object wherein a magnitude of a value less than 0 for a voxel indicates value of the voxel having as low a dose as possible.

33. The one or more computing systems of claim 28 wherein the adjoint of the ART is expressed in terms of an adjoint of an Exponential Radon Transform.

34. The one or more computing systems of claim 28 wherein the cost function factors in importance of a voxel in being part of the 3D object.

35. The one or more computing systems of claim 28 wherein the cost function is based on rotation rate of the volume relative to a projector that projects the light intensity field.

36. The one or more computing systems of claim 35 wherein the rotation rate is constant.

37. The one or more computing systems of claim 35 wherein the rotation rate is variable.

38. The one or more computing systems of claim 28 wherein the computer-executable instructions that apply of the optimization technique constrain the light intensity field based on a maximum energy dose.

39. The one or more computing systems of claim 28 wherein the ART is further based on a light absorption coefficient of the material expressed as a light absorption field with a value for each voxel.

40. The one or more computing systems of claim 39 wherein when an optically-opaque object is included within the volume of material, the instructions set the value of the light absorption field for voxels with the optically-opaque object to indicate that a light ray in a direction of a voxel of the optically-opaque object is absorbed by the material within that voxel.

41. The one or more computing systems of claim 28 wherein the cost function includes a regularizer to control uniformity of dose within the voxels that contain material to be part of the 3D object.

42. The one or more computing systems of claim 28 further comprising computer-executable instructions to compensate for non-linear response of a material transformation rate to energy by representing the material transformation rate as energy raised to a transformation power that is less than one and raising light intensities of the light intensity field to one over the transformation power and rescaling the light intensities based on a maximum light intensity.

43. The one or more computing systems of claim 28 further comprising computer-executable instructions to generate an initial light intensity field for use by the optimization technique based on a weighted projection.

44. The one or more computing systems of claim 43 further comprising computer-executable instructions to determine weights for the weighted projection using a Simultaneous Algebraic Reconstruction technique to generate the initial light intensity field from the 3D geometry of the 3D object.

45. The one or more computing systems of claim 28 wherein the light intensity field includes images to be projected during one rotation of the volume of the material relative to a projector projecting the images.

46. The one or more computing systems of claim 28 further comprising computer-executable instructions to generate from the light intensity field a multi-rotation light intensity field to be projected by a projector during multiple rotations of the volume of the material relative to the projector to generate an effective dynamic range that is greater than a dynamic range of the projector wherein the light intensity field is determined based on the effective dynamic range.

47. The one or more computing systems of claim 46 wherein a pixel of the multi-rotation light intensity field is set to a maximum intensity of the projector during one or more rotations to generate an effective intensity level that is outside the dynamic range.

48. The one or more computing systems of claim 47 wherein the intensities of a certain pixel of the images of the multi-rotation light intensity field are projected in order starting with the lowest intensity so that the highest intensity is projected in the last rotation.

49. The one or more computing systems of claim 27 wherein the light intensity field includes images.

50. The one or more computing systems of claim 49 wherein the device includes a projector and a stage, the stage holds the 3D object.

51. The one or more computing systems of claim 50 wherein the projector is stationary and the stage rotates.

52. The one or more computing systems claim 50 wherein the stage is stationary and the projector revolves around the stage.

53. The one or more computing systems of claim 49 wherein the computer-executable instructions that output send the light intensity field to the device.

54. The one or more computing systems of claim 27 wherein computer-executable instructions that apply the optimization technique constrain the light intensity field to a maximum energy dose.

55. The one or more computing systems of claim 27 wherein the cost function includes a regularizer to control uniformity of energy dose within the 3D geometry.

56. The one or more computing systems of claim 27 wherein the 3D geometry represents an existing 3D object.

57. The one or more computing systems of claim 56 wherein the 3D object is within a volume.

58. The one or more computing systems of claim 57 wherein the volume is a body of an organism.

59. The one or more computing systems of claim 27 wherein when a projector for projecting the light intensity field is a parallel beam projector, the cost function generates a measure of effectiveness of a light intensity field based on projected light rays being parallel.

60. The one or more computing systems of claim 27 wherein when a projector for projecting the light intensity field is cone beam projector, the cost function generates a measure of effectiveness of a light intensity field based on projected light rays having a cone-shaped spread.

61. The one or more computing systems of claim 27 wherein when a projector for projecting the light intensity field is a cone beam projector, the cost function generates a measure of effectiveness of a light intensity field based on projected light rays approximated as being parallel.

62. The one or more computing systems of claim 27 wherein the 3D specification specifies voxels of a volume of material that are to be part of a 3D object having the 3D geometry and further comprising computer-executable instructions to compensate for non-linear response of a material transformation rate to energy by representing the material transformation rate as energy raised to a transformation power that is less than one and raising light intensities of the light intensity field to one over the transformation power and rescaling the light intensities based on a maximum light intensity wherein the transformation power varies during different phases of the transformation.

63. The one or more computing systems of claim 62 wherein the phases include an inhibitor depletion phase and a polymerization phase.

64. The one or more computing systems of claim 27, wherein the computer-executable instructions further comprise computer-executable instructions for controlling the one or more computing systems to:
generate an initial light intensity field for use by the optimization technique based on a weighted projection; and
generate an initial light intensity field for use by the optimization technique based on the weighted projection;
determine weights for the weighted projection based on a reverse Simultaneous Algebraic Reconstruction Technique (SART) to generate the initial light intensity field from the 3D geometry of the 3D object.

65. A method performed by one or more computing systems for determining a light intensity field for use in manufacturing a 3D object from a volume of material, the material being photoreactive and having a dose curing threshold indicating energy dose that results in curing material, the method comprising:
receiving a 3D specification of a 3D geometry for the 3D object, the 3D specification specifying voxels within the volume of material that are to be part of the 3D object;
accessing a specification of a cost function for generating a measure of effectiveness of a light intensity field in manufacturing the 3D object, the cost function being based on an adjoint of an Attenuated Radon Transform (ART) that models an energy dose that each voxel would receive in manufacturing the 3D object based on the light intensity field;

generating an initial light intensity field for use by an optimization technique based on a weighted projection, wherein the optimization technique employs the cost function to generate a measure of effectiveness of possible light intensity fields and identifies based on the measures of effectiveness a light intensity field for use in in manufacturing 3D object, including determining weights for the weighted projection based on a reverse Simultaneous Algebraic Reconstruction Technique (SART) to generate the initial light intensity field from the 3D geometry of the 3D object;

determining a light intensity field for use in manufacturing the 3D object by applying the optimization technique;

outputting an indication of the light intensity field; and controlling a device to project images of the light intensity field onto the volume of material.

66. The method of claim 65 wherein the cost function is based on a sigmoid function.

* * * * *